United States Patent [19]

Lajovic

[11] Patent Number: 4,928,877

[45] Date of Patent: May 29, 1990

[54] METHOD OF MAKING A LAMINATED TUBULAR BODY

[75] Inventor: Dusan S. Lajovic, Smithfield, Australia

[73] Assignee: Impact International Pty, Ltd., Smithfield, Australia

[21] Appl. No.: 257,534

[22] Filed: Oct. 14, 1988

[30] Foreign Application Priority Data

Oct. 15, 1987 [AU] Australia ............................ PI4901
Feb. 3, 1988 [AU] Australia ............................ PI6552
Sep. 2, 1988 [AU] Australia ............................ 21802/88

[51] Int. Cl.⁵ ............................ B65D 5/40; B65D 5/74
[52] U.S. Cl. ............................ 229/125.42; 206/45.31; 220/82 R; 220/94 R; 229/117.12; 229/162
[58] Field of Search ............... 229/52 B, 162, 123.2, 229/125.15, 125.42; 206/45, 31; 220/82 R, 91, 94 R, 418, 465; 222/527, 530, 210, 465.1, 572

[56] References Cited

U.S. PATENT DOCUMENTS

| | | | |
|---|---|---|---|
| 2,154,584 | 4/1939 | Rossi | 222/527 |
| 3,017,907 | 1/1962 | Moslo | 206/45.31 |
| 3,124,915 | 3/1964 | Arneson | 206/45.31 |
| 3,400,878 | 9/1968 | Heller, Jr. et al. | 206/45.31 |
| 3,432,070 | 3/1969 | Carpenter, Jr. et al. | 220/465 |
| 3,432,380 | 3/1969 | Weber | 220/82 R |
| 3,459,625 | 8/1969 | Heller, Jr. et al. | 206/45.31 |
| 3,497,059 | 2/1970 | Watts, Jr. | 206/45.31 |
| 3,690,523 | 9/1972 | Link | 229/162 |
| 4,696,840 | 9/1987 | McCullough et al. | 229/162 |
| 4,712,711 | 12/1987 | Geering et al. | 220/465 |
| 4,793,519 | 12/1988 | Voorhies, Jr. | 220/465 |
| 4,815,655 | 3/1989 | Jacobsson et al. | 229/123.2 |

*Primary Examiner*—Gary Elkins
*Attorney, Agent, or Firm*—Nies, Kurz, Bergert & Tamburro

[57] ABSTRACT

A laminated tubular body comprising; an outer layer and an inner layer which contacts the inner surface of the outer layer; wherein the outer layer is penetrated by at least one aperture and the inner layer extends into said at least one aperture.

21 Claims, 18 Drawing Sheets

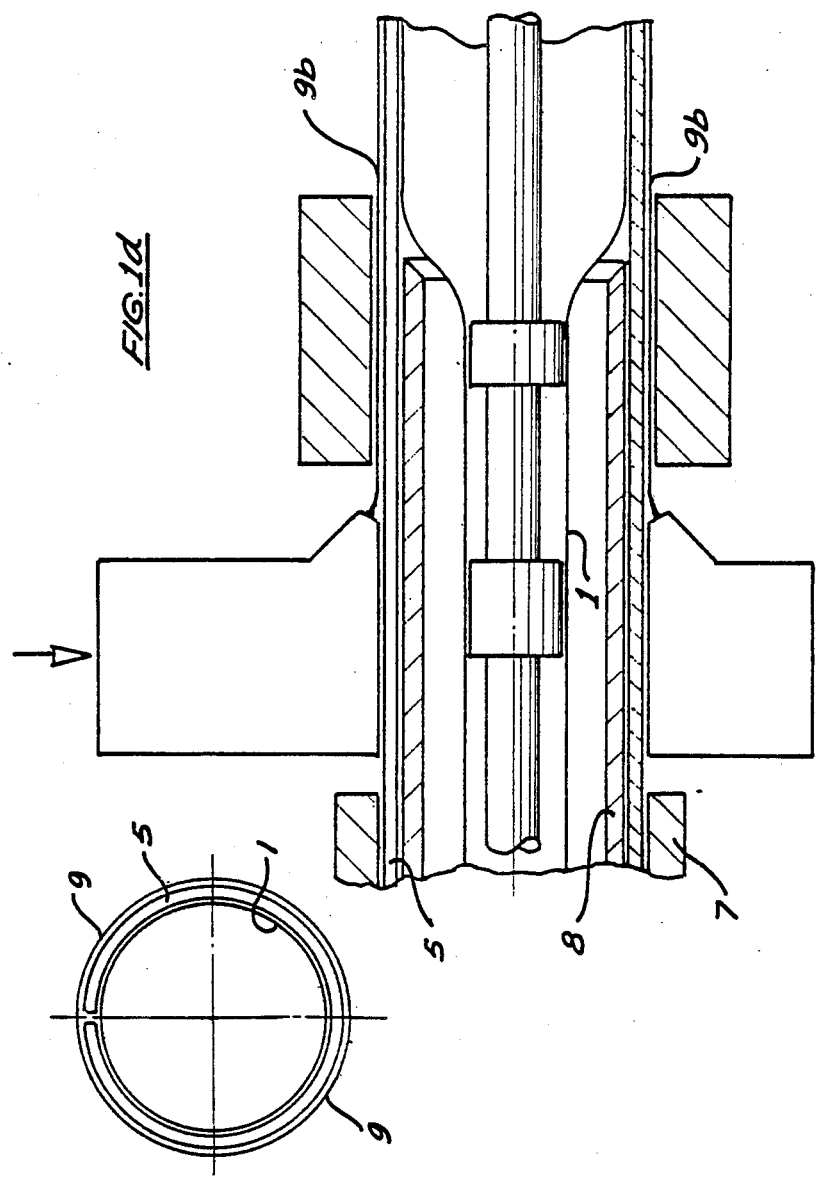

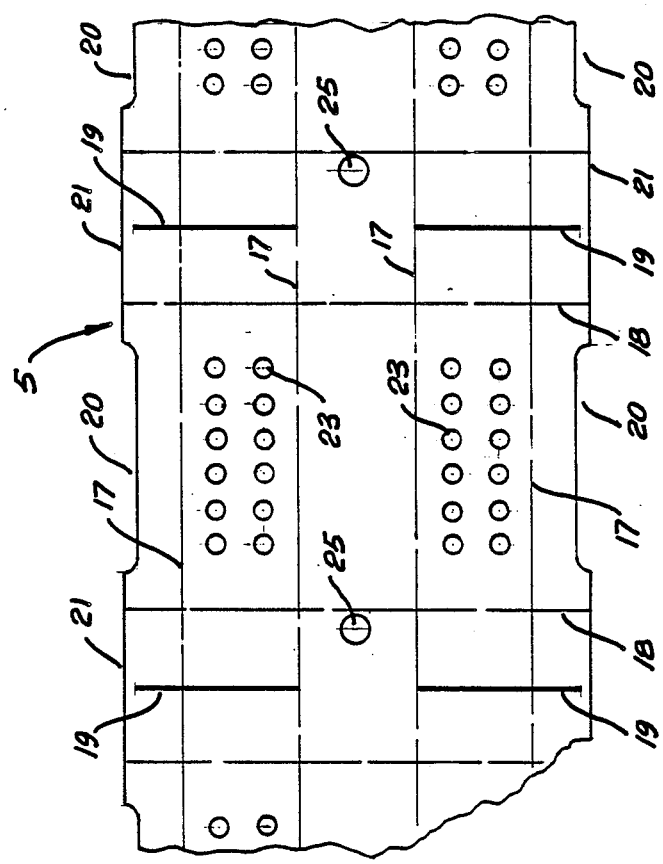

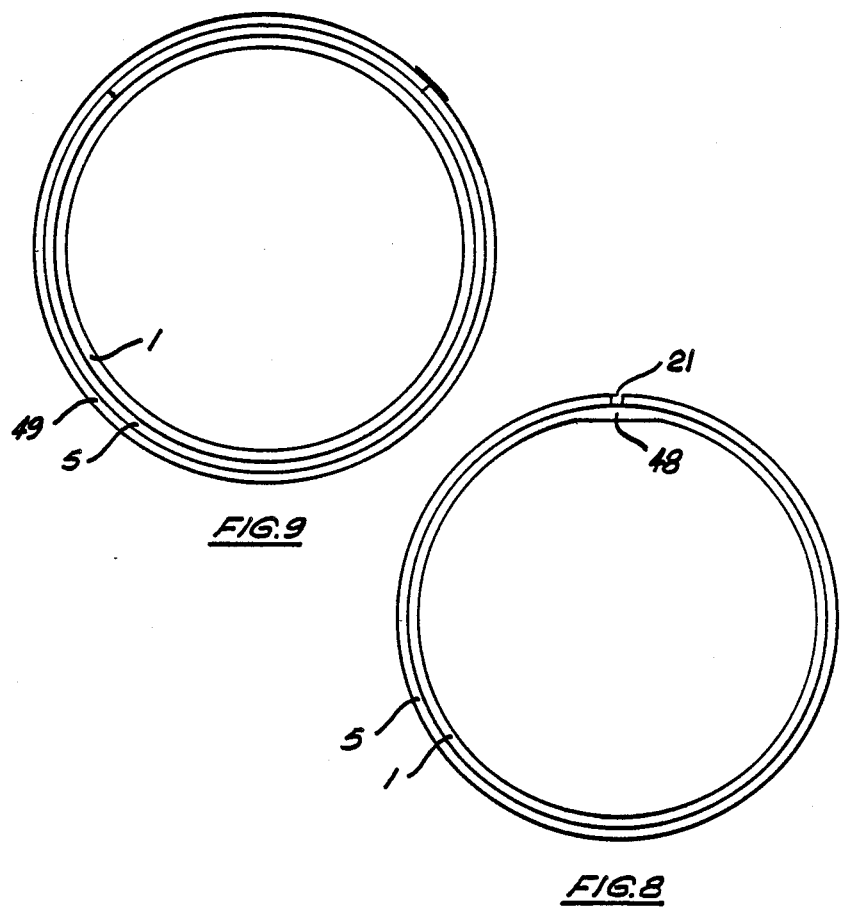

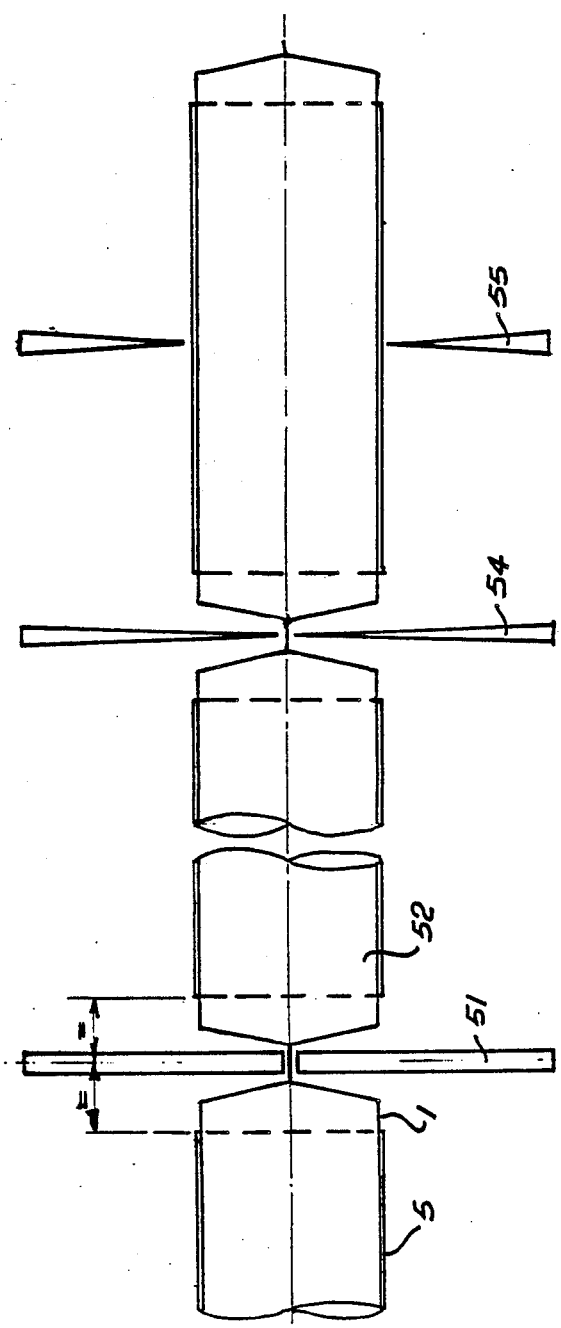

METHOD OF MAKING A LAMINATED TUBULAR BODY

This invention concerns a laminated tubular body and a method of making such a body. In particular the invention relates to laminated tubular bodies which have an extruded inner layer inflated to contact the inner surface of an outer layer.

According to a first aspect of the present invention there is provided a laminated tubular body comprising; an outer layer and an inner layer which contacts the inner surface of the outer layer; wherein the outer layer is penetrated by at least one aperture and the inner layer extends into said at least one aperture.

Preferably a transparent panel covers one or more apertures in the outer layer and the inner layer contacts the inner surface of the transparent panel.

The inner layer is preferably extruded and inflated to contact the inner surface of the outer layer and panel, and is sufficiently thin once inflated to allow any contents of the tubular body to be perceived through the panel. Advantageously the inner layer is transparent.

The transparent panel may comprise a strip of adhesive tape, or an extruded strip of similar composition to the inner layer. Alternatively an enveloping sleeve may be extruded directly onto the outside of the tubular body to provide the transparent panel and a protective surface over the tubular body.

Also preferably the inner layer extends through the or at least some of the apertures in the outer layer and forms projections on the outer surface of the outer layer so that the body may be more easily gripped. Advantageously the apertures are arranged over the outer layer in a conveniently grippable pattern, such as the shape of a hand.

Also preferably the inner layer extends through one aperture to form a spout through which a channel may communicate between the interior and the exterior of the tubular body. Advantageously the spout is collapsible and the channel may be closed by bending the spout. In one embodiment a releasable adhesive flap is used to selectively secure the spout flat against the exterior surface of the outer layer.

Advantageously when the spout is formed a plastics tab is attached to its end, and a line of weakness is incorporated between the tab and spout to facilitate tearing off of the tab by hand in order to open the spout. This arrangement compares favourably with paper spouts which, when torn, have exposed fibrous edges where bacteria may grow.

A further advantage of the spout and detachable tab arrangement is that the container becomes pilfer obvious insofar as there is no resealable seam or join between the spout and tab, so any attempt to add or subtract to the contents of the container is difficult to disguise.

According to a second aspect of the invention there is provided a method of making a laminated tubular body comprising the steps of:
drawing the opposite longitudinal edges of a strip of material into Proximity to form a tubular body, the strip of material being shaped or cut such that the tubular body is penetrated by at least one aperture;
extruding a hollow member from a die, and
inflating the hollow member so that it is applied to the interior surface of the tubular body and forced into said at least one aperture.

Preferably the resulting laminated tubular body is then sectioned into lengths.

Also preferably a transparent panel is attached over the top of one or more apertures before the hollow member is inflated, and when the hollow member is inflated it is applied to the interior surface of the panel.

Also preferably there are a plurality of apertures and the hollow member is inflated to such an extent that it extends through the plurality of apertures to form a series of projections on the outer surface of the tubular body.

Also preferably the hollow member is inflated to extend through an aperture and form a spout. The formation of a spout in this way is highly advantageous insofar as it obviates the need for a separate spout-forming process step. Advantageously a mould for the spout is releasably secured to the exterior of the strip of material in the region of the hole to form the spout. If desired relatively low, or negative, pressure may be applied to the mould to assist in the flow of the hollow member into the mould. In a preferred embodiment a tab is positioned in the mould before the extruded member is inflated, so that on formation of the spout the tab may be pressure welded to its extremity.

Preferably a filling passage is provided through the center of the extrusion die to enable the container to be filled as soon as it is formed. The container may be sealed immediately after filling, thus ensuring that contamination during transport and further handling does not take place.

The strip of material may have straight longitudinal edges or serrated edges and it may be formed into a tubular body in order to form, in the finished product, a substantially straight longitudinal seam or a spiral one. The material itself, which may comprise several layers, may be plastics, cardboard, metal or any other material. The hollow member may have barrier, adhesive, sealing, welding or other properties as desired. The finished laminated tubular bodies may be further processed to make containers, for instance laminated paper or metal foil containers for milk, laminated Plastics containers for salt, or laminated metal containers for fruit.

According to a third aspect of the invention there is provided a method of making a series of laminated tubular bodies comprising the steps of:
extruding a continuous hollow member;
drawing the opposite longitudinal edges of a strip of material into proximity to form a tubular body;
arranging a plurality of said tubular bodies around spaced apart portions of the hollow member;
inflating the hollow member to apply it to the interior surface of each tubular body to make a series of laminated tubular bodies joined by tubes of the inflated hollow member.

Preferably the strips of material originate from a continuous supply from which they are cut immediately prior to being drawn around the spaced apart portions of the hollow member. In other embodiments they are formed into tubular bodies prior to being cut and then subsequently moved into engagement with the hollow member.

Also preferably the tubes of the inflated hollow member which connect each tubular body are gathered and sealed to form a series of individual sealed laminated tubular bodies. The individual sealed bodies may then be separated to form bodies sealed at neither, one, or both ends.

Preferably the hollow member is extruded at a speed slower than that which the strips of material are moved so that a longitudinal stretch is introduced into the extruded member as it is inflated and applied to each body.

The laminated bodies produced by this process may be filled at the same time, or very shortly after the hollow member 17 is inflated, by means of a filling nozzle positioned through the extrusion die. In this way individually sealed and filled containers may be produced in one process. Such containers would be pilfer-proof insofar as any attempt to access the contents would be immediately apparent as a result of damage to the integrity of the continuous extruded member envelope.

In some preferred embodiments the strips of material are shaped or cut such that the tubular bodies produced are penetrated by at least one aperture. The apertures may of course be used to create an inspection window, gripping protuberances or a nozzle, or any combination of such features.

The invention will now be described by way of example with reference to the accompanying drawings in which:

FIG. 1d illustrates a portion of an alternative apparatus for use in a method embodying the second aspect of the present invention;

FIG. 2 illustrates a strip of material for use in a method embodying the second aspect of the invention;

FIG. 8 illustrates an additional feature of a laminated tubular body embodying the first aspect of the present invention;

FIG. 9 illustrates a further additional feature of a laminated tubular body embodying the first aspect of the present invention;

FIG. 10b illustrates some alternative further processing options which may follow the processing applied by the apparatus of FIG. 10a;

FIGS. 10c and 10d illustrate a portion of an alternative apparatus to that illustrated in FIG. 10a.

Figure 1A:
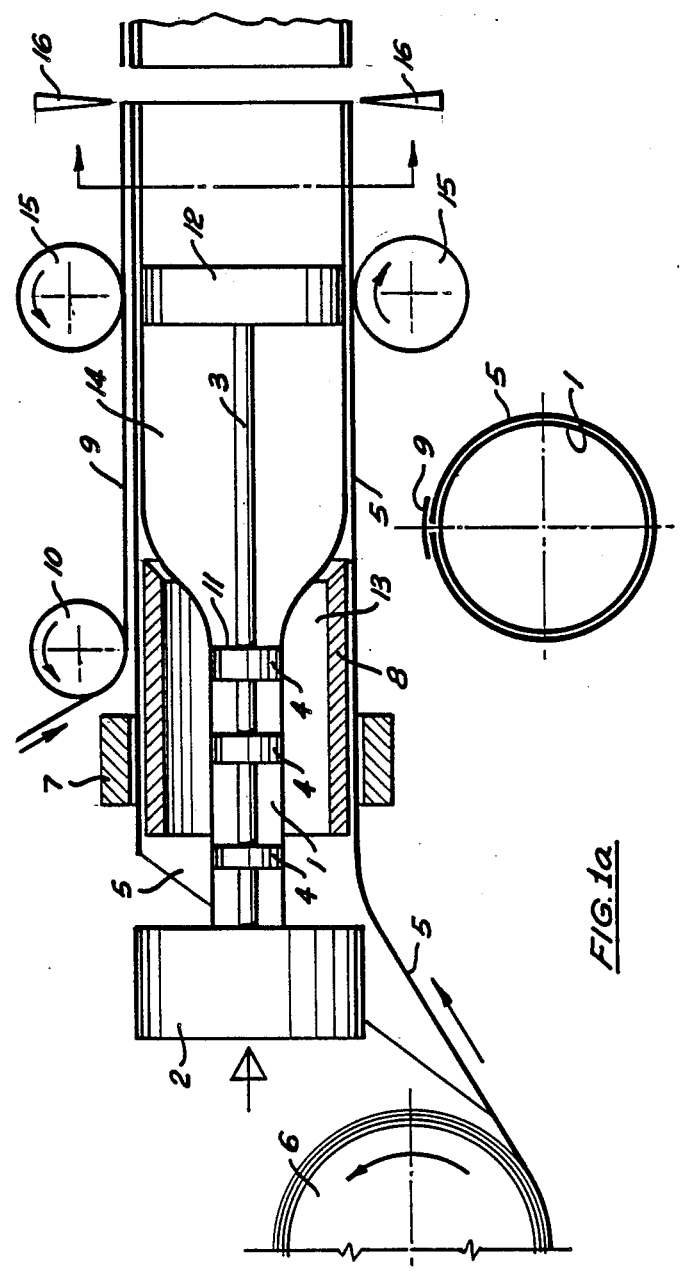
FIG. 1a illustrates an apparatus for use in a method embodying the second aspect of the invention.

Referring now to FIG. 1a, a hollow tube-like member 1 is extruded from die 2 and guided over internal mandrel 3 which is provided with cooling rings 4. A flat strip of base material 5 is drawn from a roll 6 and around the extruded member 1 by being passed through the gap between a forming ring 7 and an interior supporting mandrel 8. Die 2 could of course be repositioned at the forward end of mandrel 8 if required. The longitudinal edges of the strip of base material are brought into abutment by this process in order to completely surround the extruded member 1. A strip of adhesive tape 9 is drawn from a supply over roller 10 which presses it over the region on either side of the edges of material 5 which border the abutment. In this way the base material is made into a continuous sleeve surrounding the extruded tube-like member 1.

Nozzles 11 are provided on the third cooling ring of mandrel 3 to pump fluid, preferably air, into the interior of extruded member 1 in order to increase the pressure in area 14 relative to area 13 and inflate member 1. If desired the air may be sterilized, or alternatively another sterile or even inert gas may be used. A final disc 12 is mounted on the end of mandrel 3 some distance beyond the last cooling ring in order to maintain the inflating pressure. Disc 12 may be coated with teflon, or silicon rubber, and may have an adjustable outer diameter, possibly pneumatically controlled, to ensure the correct degree of radial stretching of member 1 is achieved.

Extruded member 1 is inflated until it contacts the inner side of the sleeve of material 5. A connection is provided between sleeve 5 and extruded member 1 by means of welding or gluing; alternatively the natural adhesive properties of material 1 may be utilized to bond the two layers together. Relatively low, or negative, pressure may be applied to area 14 to assist in the inflation of member 1, and to avoid bubbles forming between the layers. Transport rollers 15 react against disc 12 to press the layers together, and exert tension on the layers of the laminated structure to stretch extruded member 1 longitudinally as it is inflated. A cutting device 16 cuts the continuous laminated tube into lengths for further treatment, for instance for making into tubes or containers.

Figure 1B:
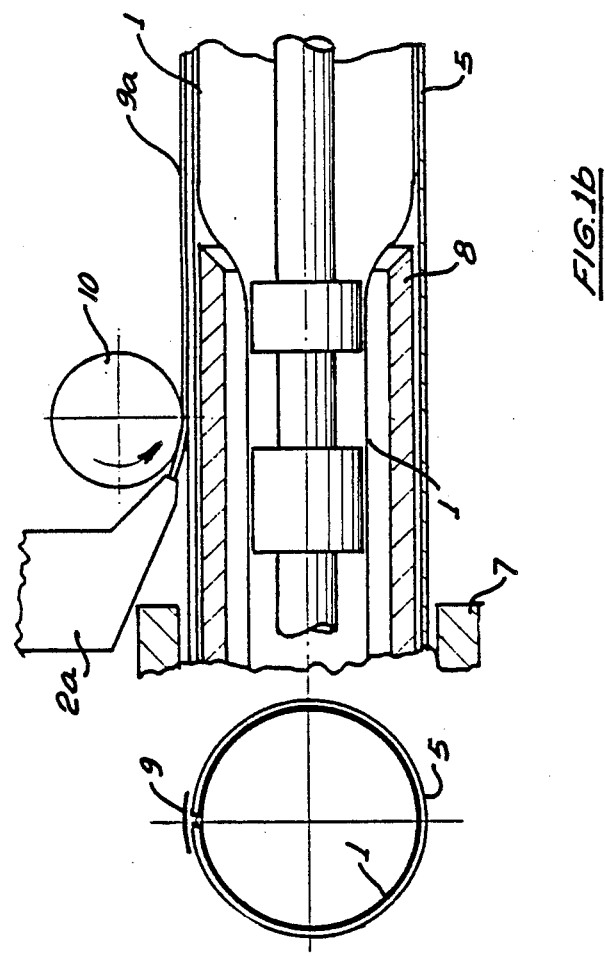
FIG. 1b illustrates a portion of an alternative apparatus for use in a method embodying the second aspect of the invention.
Figure 1C:
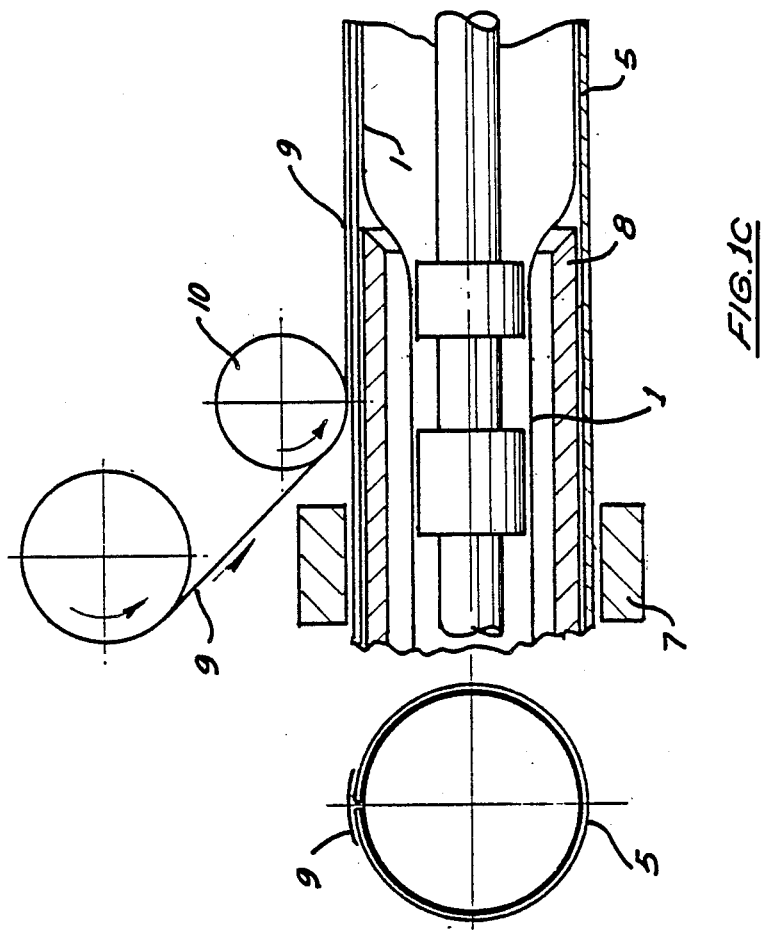
FIG. 1c illustrates a portion of the apparatus of FIG. 1a in greater detail.

Of course, the connecting material 9 could comprise a bead or strip 9a of plastics material extruded from a nozzle 2a adjacent the seam, as shown in FIG. 1b.

Alternatively a sleeve 9b of plastics material could be extruded over the entire external area of the base material and then cooled to form a continuous outer envelope, as shown in FIG. 1d.

Figure 1E:
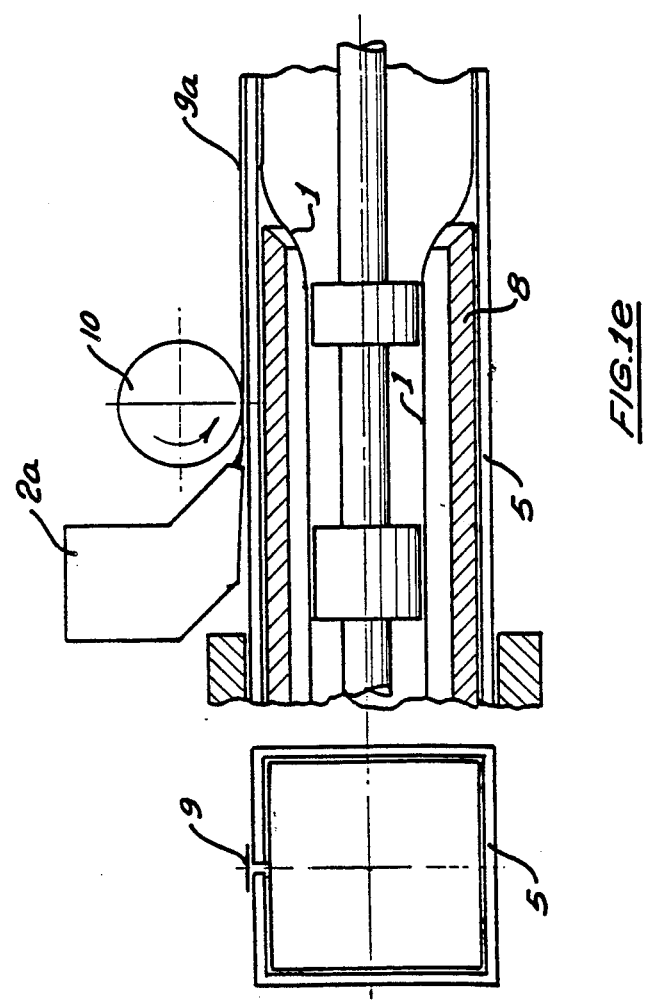
FIG. 1e illustrates a portion of an alternative apparatus for use in the method embodying the second aspect of the present invention.
Figure 1F:
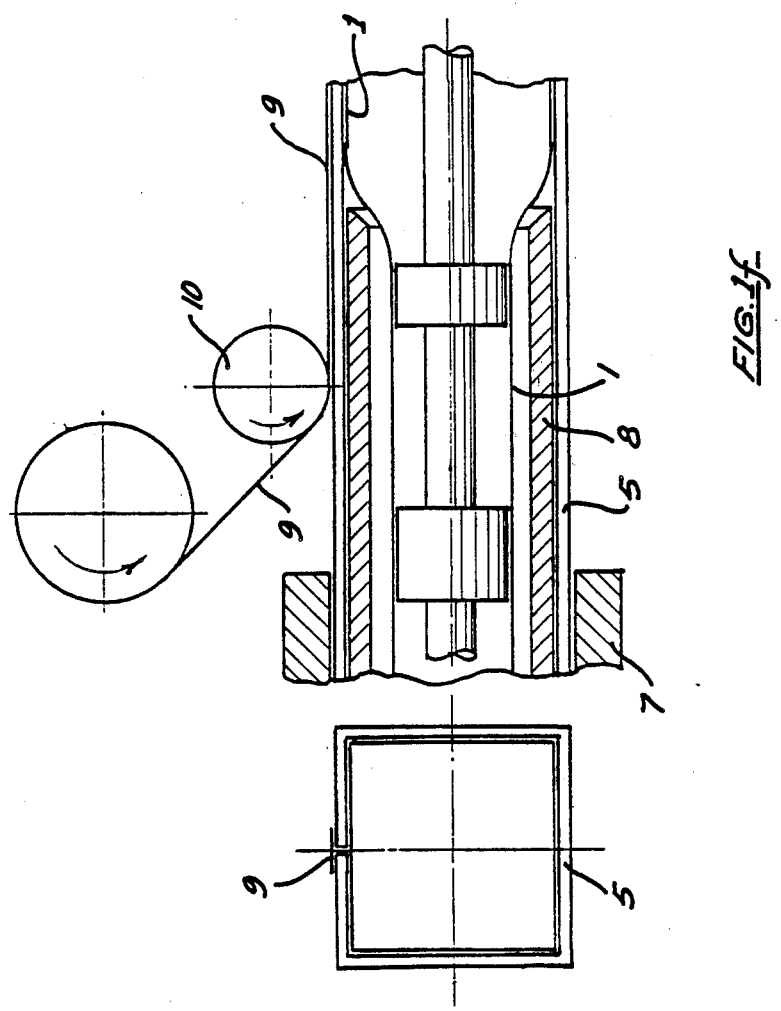
FIG. 1f illustrates a portion of an alternative of an apparatus for use in a method embodying the second aspect of the present invention.
Figure 3:
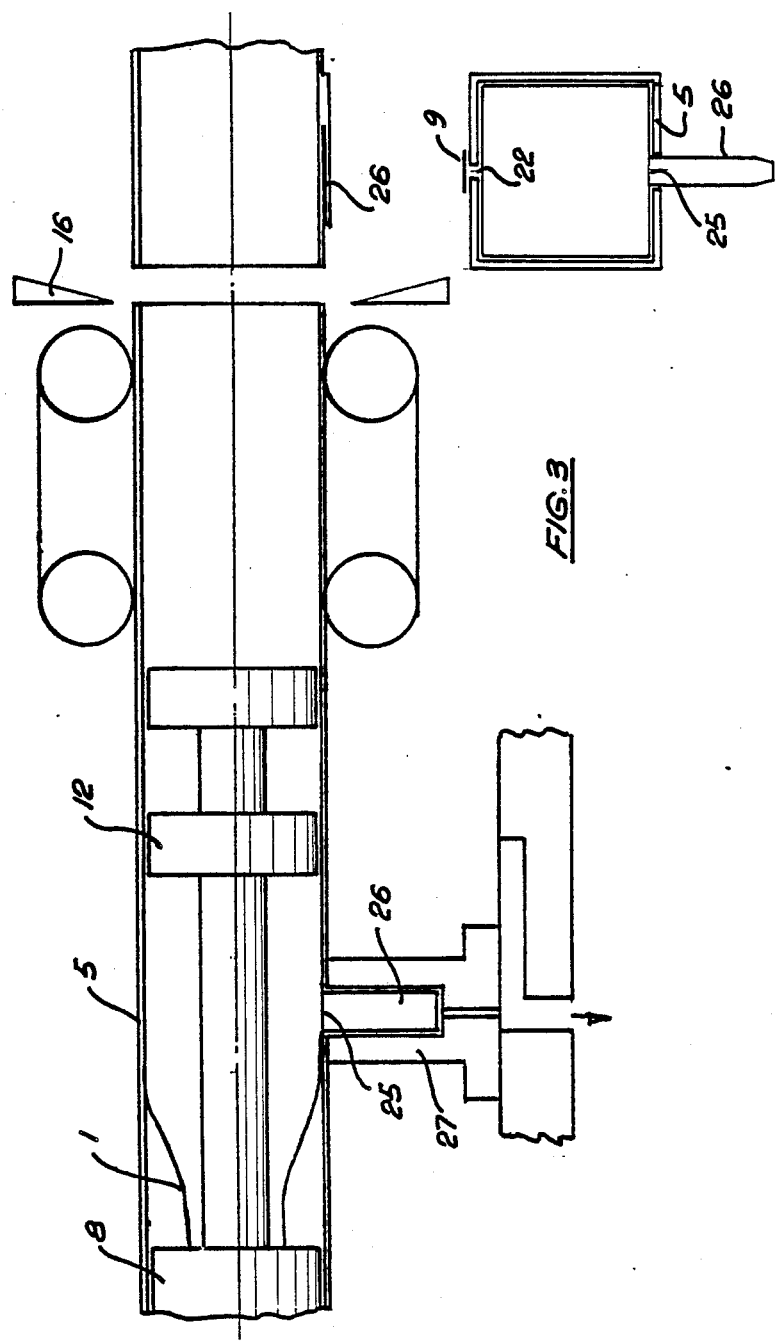
FIG. 3 illustrates an additional apparatus for use in a method embodying the second aspect of the invention.

It should also be appreciated that the base material 5 may be formed into a body of any desired cross-section and need not be circular as shown, for instance it may be square as shown in FIGS. 1e and 1f, or oblong, or polygonal in cross-section.

Referring now to FIG. 2 a strip of base material 5 will be described from which a laminated tubular body of square cross-section embodying the first aspect of the present invention may be produced. The base material 5 is pre-creased longitudinally 17 and transversely 18, or otherwise weakened as necessarY for further processing. The base material is also slit 19 at intervals to allow easy separation of the finished laminated tubular bodies; in this case base material 5 is paper. Regions of the paper may be treated with contact adhesive to assist in forming the final articles. Half slots 20 are cut out of the opposing edges 21, such that when the opposing edges are butted together a complete slot 22 appears down each body.

When the opposing edges 21 are butted together a transparent strip of connecting material is pressed along the join in order to connect edges 21 together and form a transparent panel covering slot 22. When the extruded member is subsequently inflated it expands and contacts the inner surfaces of the base material and transparent strip and adheres to them. In this way the seam along the base material is reinforced. The extruded member is made from a transparent material, or at least a material through which some light can pass, in order to provide an inspection window through slot 22. It is not necessary for the inspection window to be completely transparent provided any contents of the body can be perceived through it, for instance in cases where a dark coloured liquid is contained within the tubular body a window of light coloured fairly opaque material would suffice to enable the level of liquid to be discerned.

The inspection window need not, of course, be provided by means only of two half-slots 20 in the butting edges, and could equally well be provided by a complete slot cut into the body of base material 5, or a series of holes. The transparent panel need not serve to strengthen the seam in the formed tubular body, and other seam strengthening means could be employed if the strength of the bond between the inflated extruded member and the butted edges was not sufficient to hold the base material together.

The base material 5 is also penetrated by a pattern of small holes 23, and when the extruded member 1 is inflated it is pushed through holes 23 to form a series of projections 24 on the outer surface of the base material. Projections 24 are useful to provide grip on the outer surface of the final article and may be arranged in a pattern ergonomically designed to assist grip, such as hand-shaped. This is particularly useful for flimsy containers which are filled with heavy liquids, such as milk and fruit juice cartons. It should, of course, be appreciated that this feature is optional.

Figure 4A:
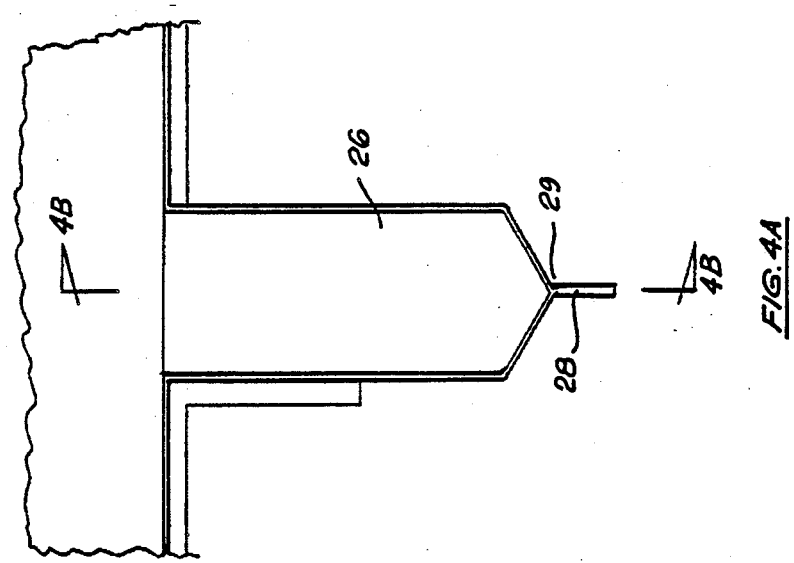
FIGS. 4a and 4b illustrate a spout having a detachable plastics tab such as may be provided on a laminated tubular body embodying the first aspect of the invention.
Figure 4B:
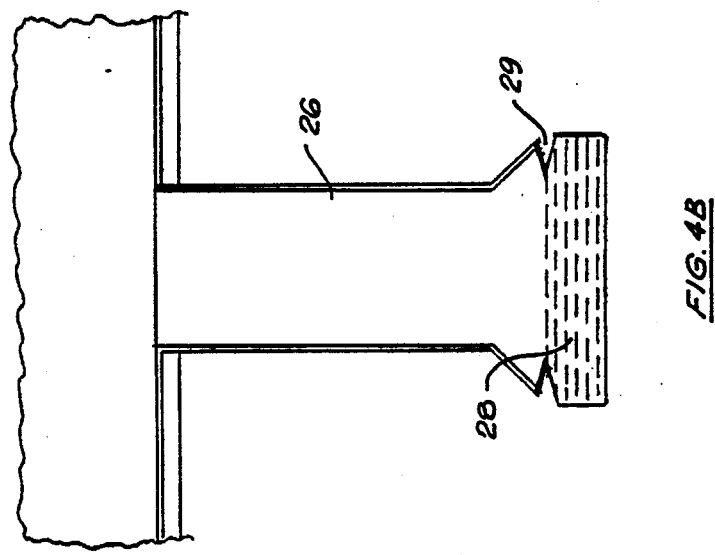

A slightly larger hole 25 is left in the base material 5 so that after it has been connected around the extruded member 1 and member 1 expanded, a spout 26 is formed by the expansion of the material of member 1 through hole 25 in the base material. A former or mould 27 for the spout is drawn alongside the base material, or alternatively is detachably attached at intervals in order to mould the shape of the spout. Relatively low, or negative, pressure may be applied to the distal end of former 27 in order to encourage the extruded material to adopt the shape of the nozzle. A tab 28 of plastics material as shown in FIGS. 4a and 4b may be provided in the mould before the spout is formed such that when the spout is formed it is welded to the plastics tab. The plastics tab 28 being welded to the spout along a line of weakness 29 which allows the tab to be manually detached in order to open the spout.

Once the extruded member has been inflated to its final shape and dimensions the tubular bodies may be separated by cutters 16 prior to further processing, such as folding, sealing top and bottom and filling, to produce a finished article.

Figure 5:
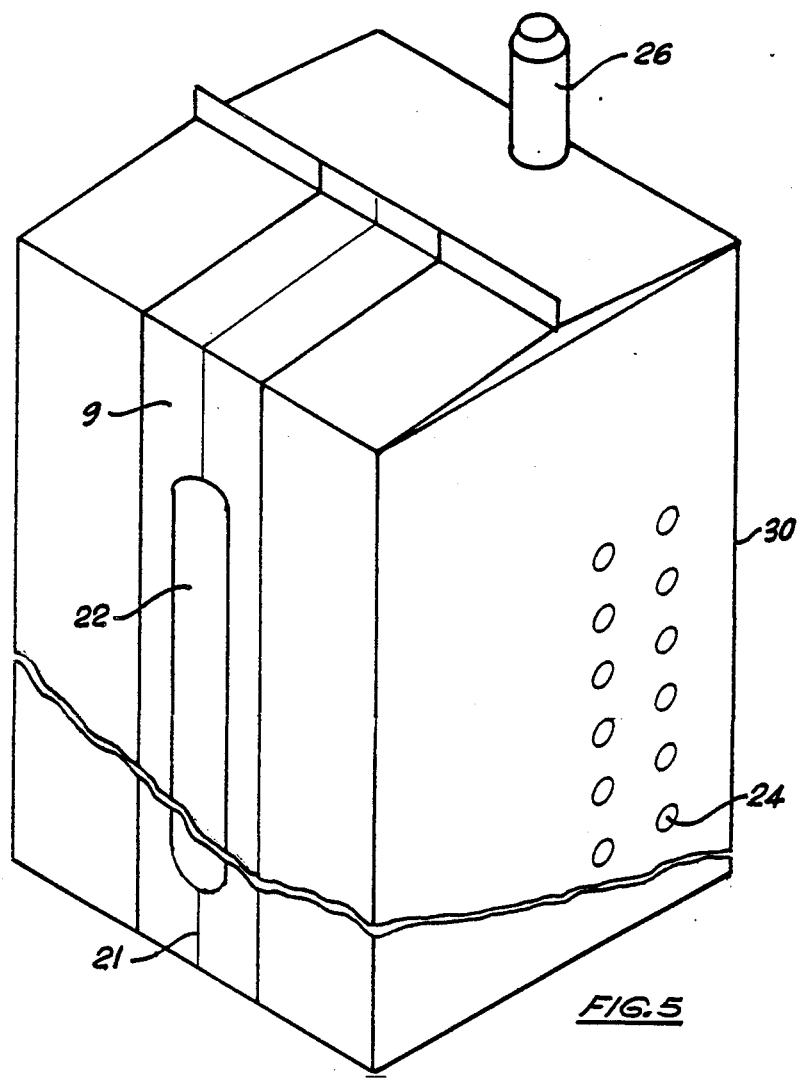
FIG. 5 illustrates a laminated tubular body embodying the first aspect of the invention.
Figure 6A:
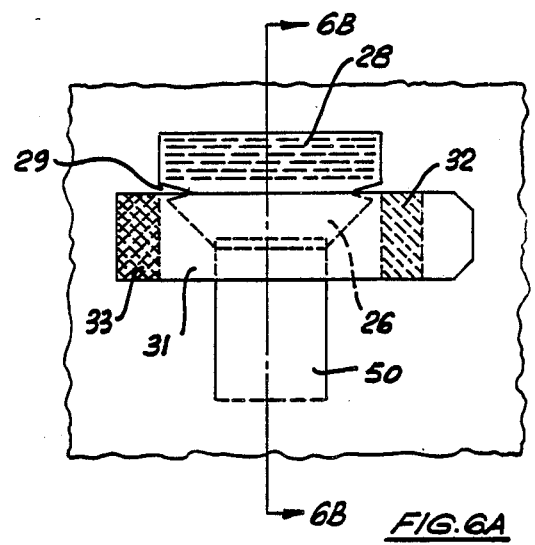
FIGS. 6a and 6b illustrate an additional feature of the laminated tubular body illustrated in FIG. 4.
Figure 6B:
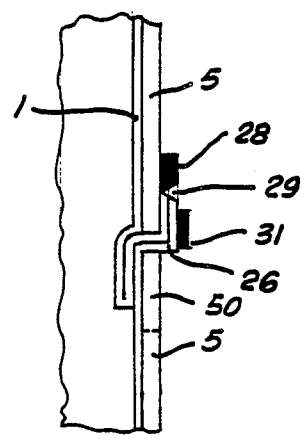
Figure 6C:
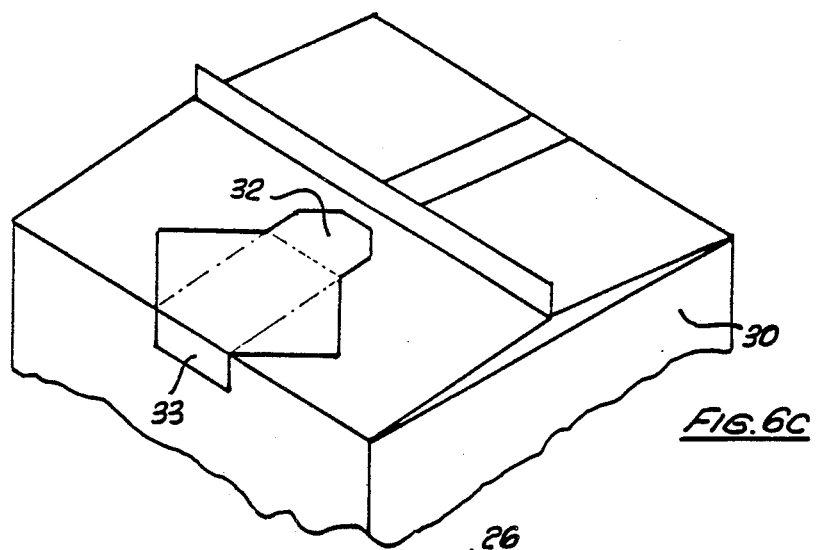
FIGS. 6c and 6d illustrate an alternative to the additional feature of FIG. 6a and 6b.
Figure 6D:
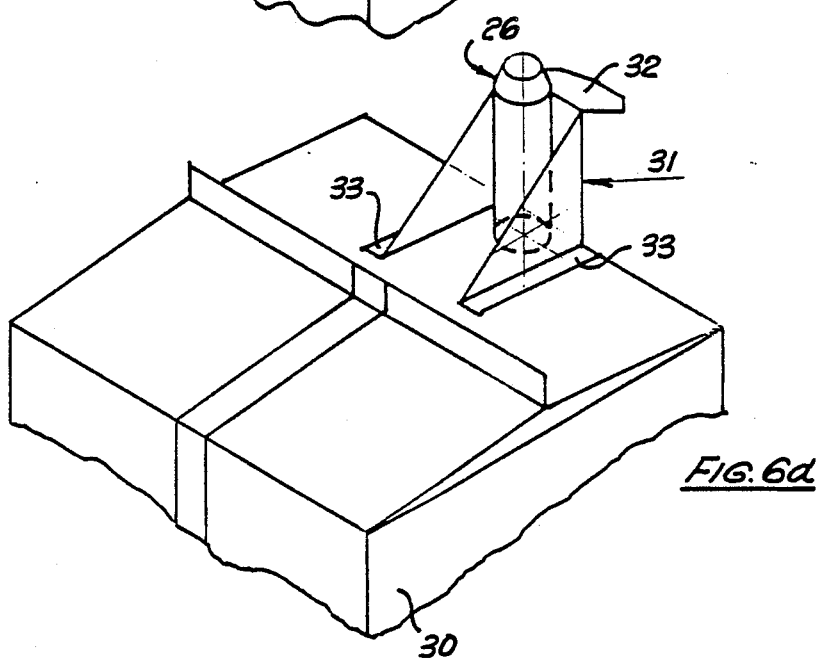

FIG. 5 shows a finished article 30 embodying the first aspect of the present invention with an inspection window 22, gripping protuberances 24 and a spout 26. It should be appreciated that spout 26 is collapsible and may be pushed flat against the side of finished article 28 or even inverted into it. It should also be appreciated that the spout is not limited to the form shown, and may be any convenient shape or form. A flap 31 as shown in FIGS. 6a and 6b may be attached over spout 26. Flap 31 is of the kind which can be lifted at one end 32 to allow the contents of the article to be poured out through the spout, and resealed. The other end 33 being permanently secured to the article. FIGS. 6c and 6d show an alternative flap.

Figure 7:
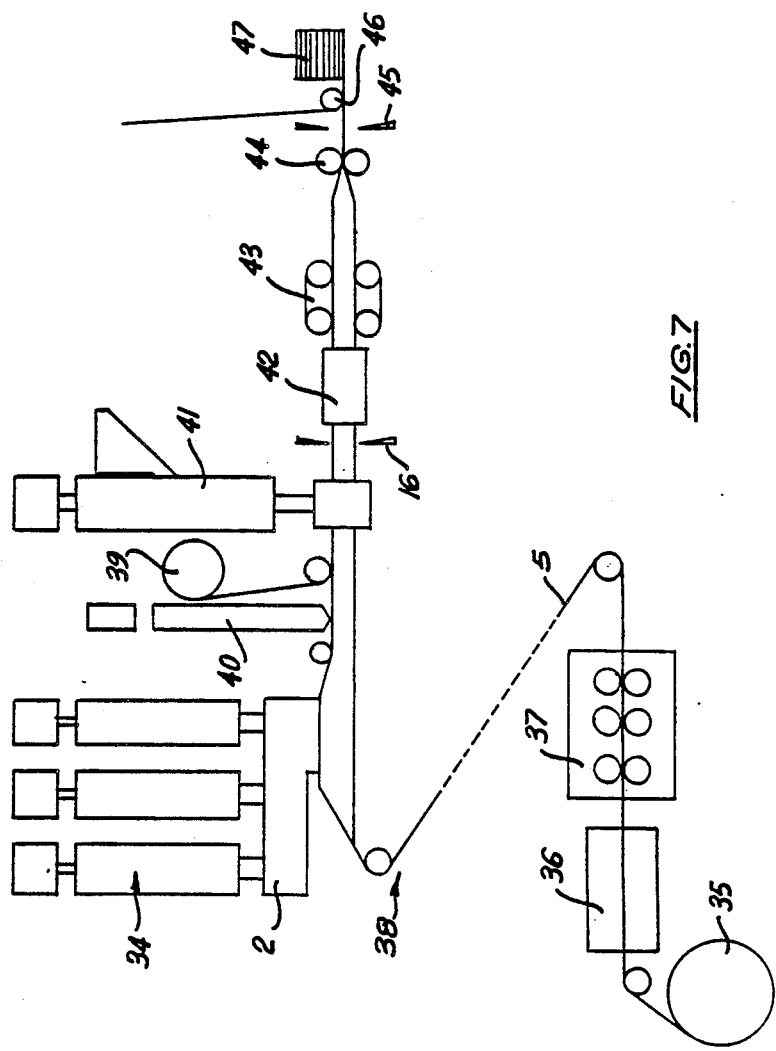
FIG. 7 illustrates an industrial plant for the mass production of laminated tubular bodies embodying the first aspect of the invention.

FIG. 7 illustrates a typical entire manufacturing plant for articles produced by the invented method. The parts of the plant corresponding to parts shown in previous FIGS. has been allocated corresponding reference numerals. A source of raw materials 34 for the extruded member feeds to the extrusion die 2. Base material 5 originates from a roll 35 which passes through a splicer 36, slitting, cutting, creasing and punching operations 37 and a flame treatment 38 before being formed between forming the ring and mandrel. The base material may also be printed if required. Adhesive tape 9 originates on a roller 39, or alternatively a sealing bead is extruded from extruder 40. Further layers of laminate may be applied, both internally and externally as desired, for instance an external sleeve may be extruded from extruder 41. The laminated bodies are cut into lengths for further processing by cutter 16. Each group of laminated bodies is cooled by cooling ring 42, and transported by caterpillar rollers 43 to be flattened, across diagonally opposite longitudinal edges, between rollers 44 before the tubular bodies are finally separated into individual articles by cutters 45. Application of flaps 29 occurs at stage 46 before the finished articles are stacked 47. The individual articles may be taken from the stack formed and filled as required.

Although the aspects of the invention have been described with reference to specific examples it should be appreciated that many alternatives are possible within the scope of the invention. For instance despite the fact that it is preferred to bring the edges of the sleeve of base material 5 into abutment they may of course be overlapped if desired. A contact adhesive may be provided onto the surface of one of the edges of the material, in this case, in order to provide a secure bond along the seam.

A refinement which is preferred when the edges are brought into abutment is to selectively adjust the local thickness of the extruded inner member in order to make it thicker, and therefore stronger, in the region of the join 48, as shown in FIG. 8.

It is also envisaged that the invention could be used as part of a more complex process. For instance a process can be envisaged in which a first sleeve of base material 5 is secured by an inflated inner layer 1 as previously described, and then a second sleeve 49 of base material is drawn around the structure with its seam radially offset from the seam of the first strip of base material, that layer being secured, say, by a strip of tape or extruded bead, see FIG. 9.

It should also be aPPreciated that a hollow channel may be incorporated into die 2 and internal mandrel 3 in order to allow the tubular laminated body to be filled as the extruded inner layer is inflated. In this way the risk of contamination of the contents of the tubular bodies can be reduced.

Further, it should be appreciated that a flap 50 of base material as shown in FIGS. 6a and 6b may be associated with the spout aperture to co-operate with flap 31 to close spout 26.

Figure 10A:
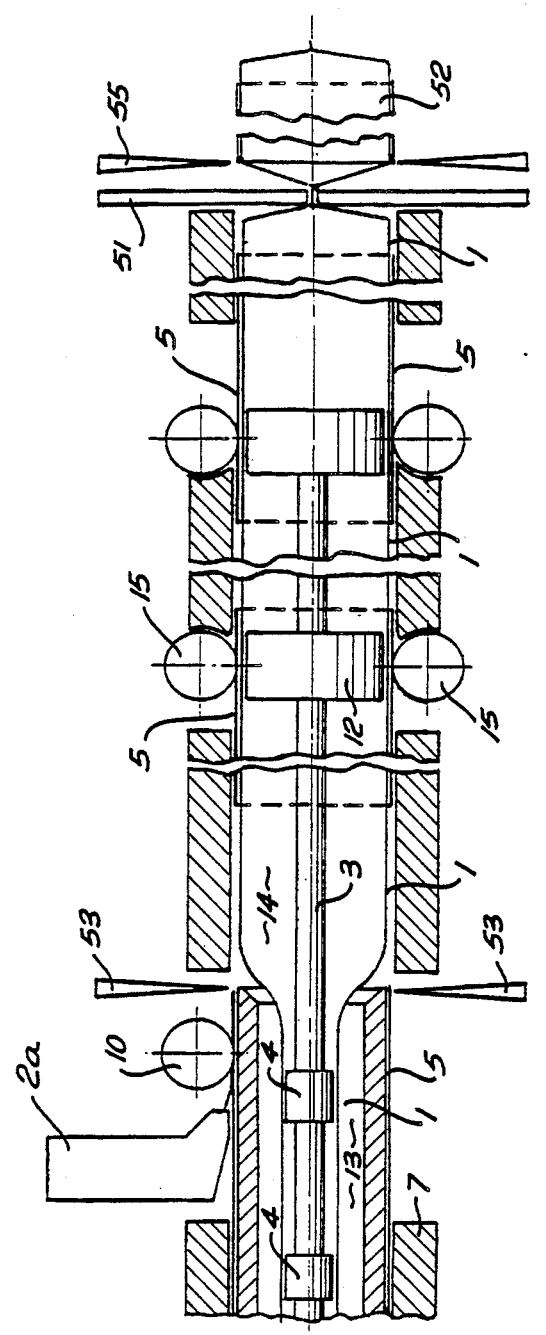
FIG. 10a illustrates an alternative apparatus for use in the method embodying the second aspect of the invention.

Finally, it should be appreciated that although the invention has been described up to now with reference to a continuous process producing an endless laminated body, the layer of base material 5 could be intermittent leaving portions of the extruded inflated member 1 exposed, as indicated in FIGS. 10a and 10b. The exposed portions could subsequently be gathered and welded by means 51 to form a series of sealed individual containers 52, which could of course have been filled when the extruded members were inflated, or very soon after.

The intermittent supply of base material could originate from a continuous roll and be cut immediately prior to being formed around the extrusion die, for instance by cutters 53.

The individual sealed, and if desired filled, containers may be separated by means of cutters 54 cutting through the gathered weld in order to form individual containers sealed at both ends. Alternatively the containers could be separated in such a way as to be sealed at only one end (saY bY cutters 55), or to be open at both ends.

Containers which are filled and sealed at both ends have the advantage that the only remaining process step required is to cap the ends of the container with a cap of suitable base material. Even if not filled the sealed containers have the advantage of being crush-proof during further processing and transport as a result of the internal pressure of the inflating fluid.

Figure 10C:
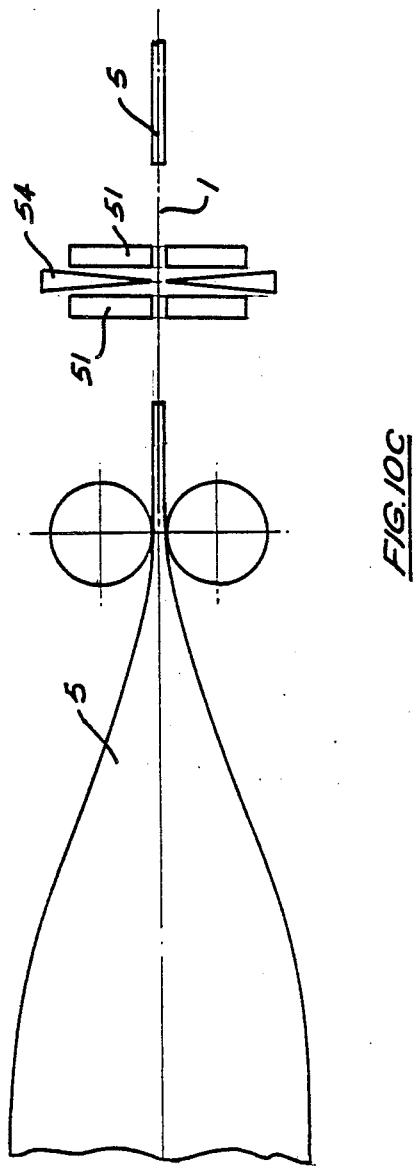
Figure 10D:
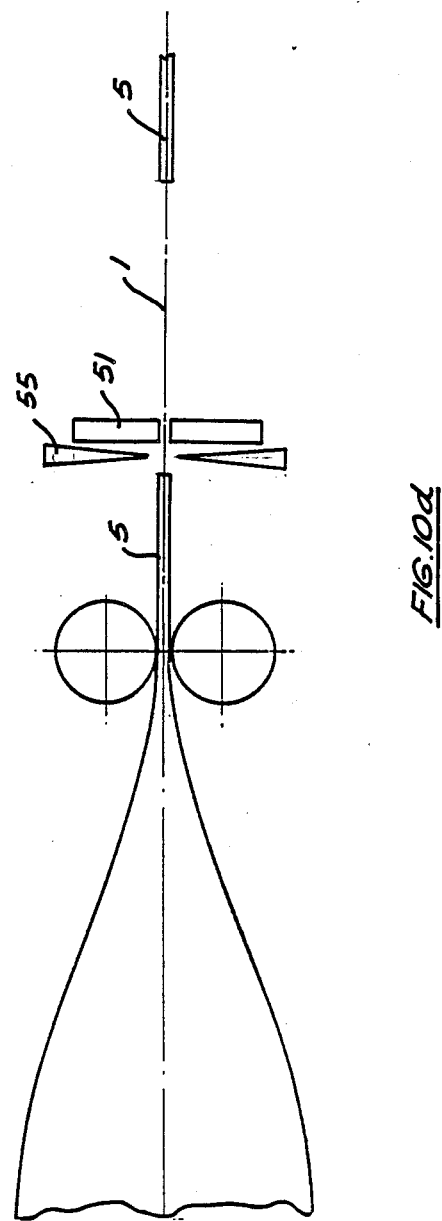

When containers are being made with a cross-section which can be flattened along pre-formed longitudinal creases and it is not desired to fill the containers immediately, the sealing and parting of the inflated member 1 may be carried out as shown in FIG. 10c to produce a container body sealed at both ends, or, as shown in FIG. 10d to produce containers sealed at only one end.

Individual containers produced in this way may of course enjoy any of the features previously described with reference to continuous bodies.

I claim:

1. A laminated tubular body comprising an outer layer having an inner surface and an outer surface and a substantially continuous inner layer in intimate contact with said outer layer to define a lining substantially covering said inner surface, said outer layer having at least one aperture through which said inner layer extends to form a sealed protuberance projecting outwardly beyond the outer surface of the outer layer.

2. A laminated tubular body as claimed in claim 1, further comprising an array of said apertures and said sealed protuberances to form a textured gripping surface enabling the body to be gripped more easily.

3. A laminated tubular body as claimed in claim 1, wherein the inner layer extends through said at least one aperture to form a spout defining a channel in fluid communication with the interior of the laminated tubular body.

4. A laminated tubular body as claimed in claim 3, wherein the spout is collapsible and wherein the channel can be substantially closed by bending the spout.

5. A laminated tubular body as claimed in claim 4, wherein the spout incorporates a closure element in the form of a manually detachable tab, made from a plastic material, to facilitate opening of the spout.

6. A laminated tubular body as claimed in claim 5, wherein the detachable tab is defined by a flattened end portion of the spout.

7. A laminated tubular body as claimed in claim 6, further comprising a selectively releasable flap to permit the spout to be selectively secured against the tubular body in a flattened configuration such that the channel is substantially closed.

8. A laminated tubular body as claimed in claim 7, wherein the detachable tab protrudes from beneath the flap to permit the spout to be opened by tearing the tab against support pressure provided by the flap.

9. A laminated tubular body as claimed in claim 8, wherein the selectively releasable flap includes a free end to facilitate release thereof.

10. A laminated tubular body as claimed in claim 9, wherein the flap comprises an adhesive tape.

11. A laminated tubular body as claimed in claim 10, further including an opening to permit filling.

12. A laminated tubular body as claimed in claim 1, wherein the laminated tubular body is completely sealed.

13. A laminated tubular body as claimed in claim 11, wherein a substantially transparent panel covers said at least one aperture and the inner layer contacts an inner surface of the transparent panel.

14. A laminated tubular body as claimed in claim 1, wherein the inner layer transmits sufficient light to permit any contents of the tubular body to be perceived through said at least one aperture.

15. A laminated tubular body as claimed in claim 13, wherein the inner layer transmits sufficient light to permit any contents of the tubular body to be perceived through the transparent panel.

16. A laminated tubular body as claimed in claim 1, wherein the inner layer is substantially transparent.

17. A laminated tubular body as claimed in claim 14, wherein the inner layer is transparent.

18. A laminated tubular body as claimed in claim 11, and further including an outer sleeve substantially enveloping the tubular body to provide a protective covering surface.

19. A laminated tubular body as claimed in claim 18, wherein the outer sleeve comprises a plastics film.

20. A laminated tubular body as claimed in claim 1, wherein the outer layer is composed of a fibrous material and the inner layer is composed of a plastics film.

21. A laminated tubular body as claimed in claim 11, wherein the outer layer is composed of paper or cardboard.

* * * * *

UNITED STATES PATENT AND TRADEMARK OFFICE
CERTIFICATE OF CORRECTION

PATENT NO. : 4,928,877
DATED : May 29, 1990
INVENTOR(S) : DUSAN SAVA LAJOVIC

Page 1 of 2

It is certified that error appears in the above-identified patent and that said Letters Patent is hereby corrected as shown below:

IN THE TITLE:

Correct the Title to read --LAMINATED TUBULAR BODY FOR CONTAINERS--.

Column 1, line 62, "Proximity" should be --proximity--.

Column 6, line 61, "aPPreciated" should be --appreciated--.

Column 7, line 24, "saY bY" should be --say by--.

Claim 11, column 8, line 27, change "10" to --1--.

Claim 13, column 8, line 32, change "11" to --1--.

Claim 18, column 8, line 48, change "11" to --1--.

UNITED STATES PATENT AND TRADEMARK OFFICE
CERTIFICATE OF CORRECTION

PATENT NO. : 4,928,877
DATED : May 29, 1990
INVENTOR(S) : Dusan Sava Lajovic

It is certified that error appears in the above-identified patent and that said Letters Patent is hereby corrected as shown below:

Claim 21, column 8, line 57, change "11" to --1--.

Signed and Sealed this

Seventeenth Day of September, 1991

Attest:

HARRY F. MANBECK, JR.

*Attesting Officer*  *Commissioner of Patents and Trademarks*